Sept. 8, 1964  R. M. SNOOK  3,147,662
QUICK RELEASE RETAINER NUT
Filed June 22, 1961  3 Sheets-Sheet 1
FIG_1
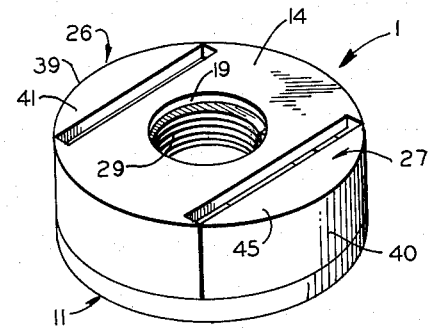
FIG_2
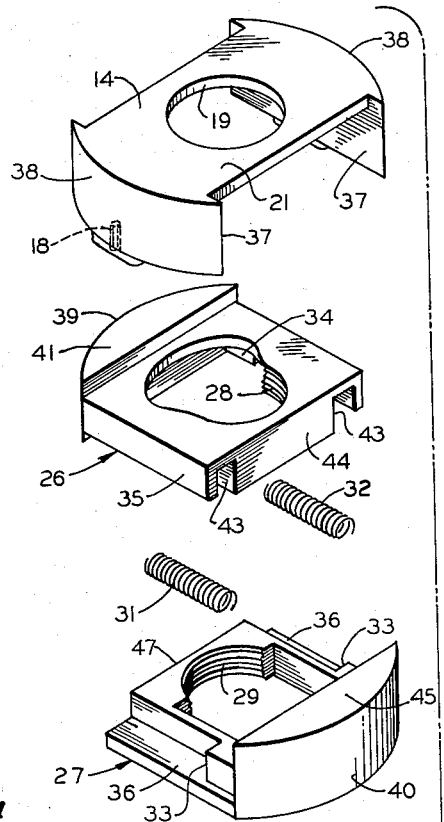
FIG_3
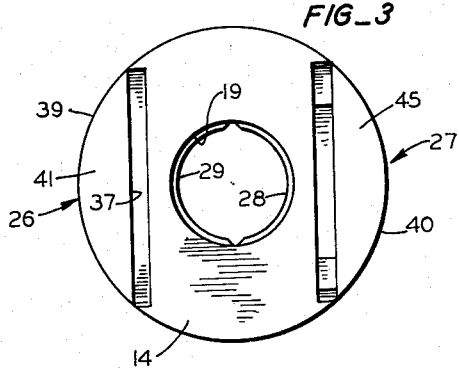
FIG_4
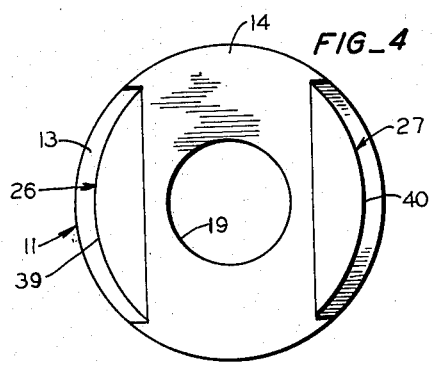
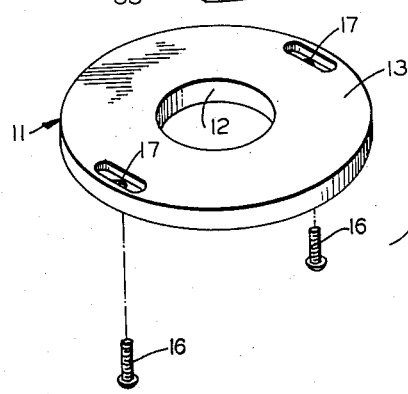
INVENTOR.
ROGER M. SNOOK
BY
ATTORNEY Sept. 8, 1964  R. M. SNOOK  3,147,662
QUICK RELEASE RETAINER NUT
Filed June 22, 1961  3 Sheets-Sheet 2
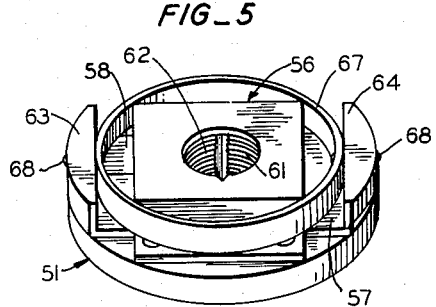
FIG_5
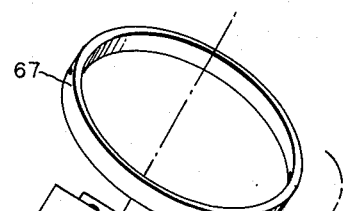
FIG_6
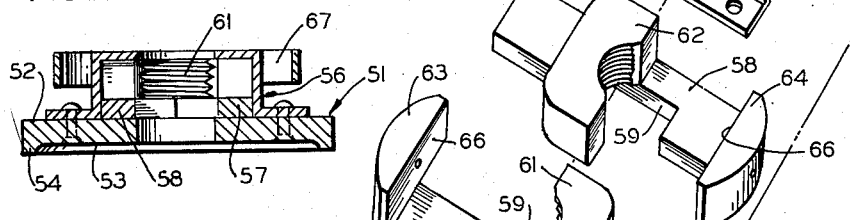
FIG_9
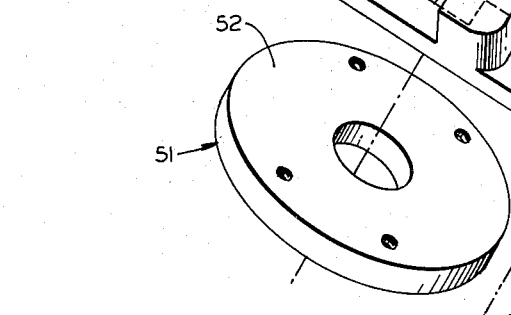
FIG_7
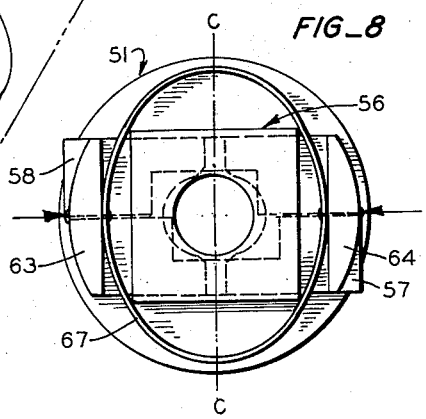
FIG_8
INVENTOR.
ROGER M. SNOOK
BY
ATTORNEY Sept. 8, 1964　　　　R. M. SNOOK　　　　3,147,662
QUICK RELEASE RETAINER NUT
Filed June 22, 1961　　　　　　　　　　　　3 Sheets-Sheet 3
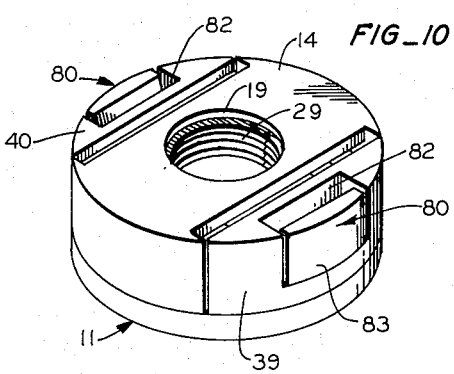
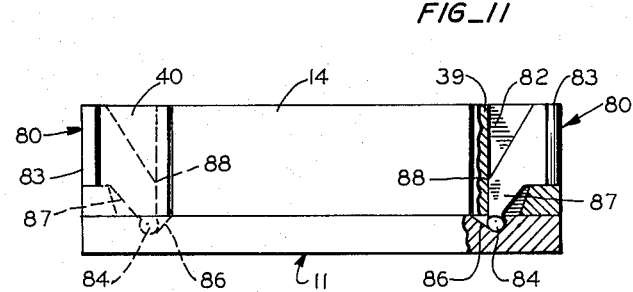
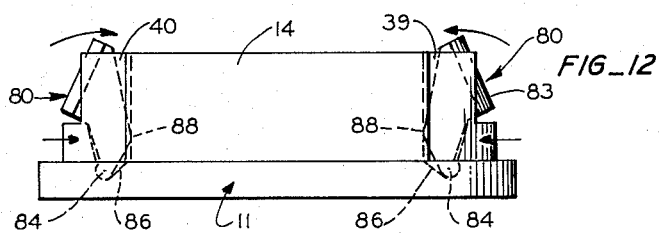
INVENTOR.
ROGER M. SNOOK
BY
ATTORNEY United States Patent Office 3,147,662
Patented Sept. 8, 1964

1

3,147,662
QUICK RELEASE RETAINER NUT
Roger M. Snook, 177 Romney Drive, Serra Highlands, South San Francisco, Calif., assignor of one-half to Joseph Lang, Jr., Santa Rosa, Calif.
Filed June 22, 1961, Ser. No. 129,490
3 Claims. (Cl. 85—33)

This invention relates generally to a quick release retainer nut for rotatable shafts and the like, and more particularly to a segmented retainer nut which positively, yet releasably, engages the threaded portion of a rotatable shaft.

There has long been a need for a suitable retaining device which is capable of securely fastening a working implement, such as a grinding wheel, rotary saw, or the like, onto a high-speed rotary shaft, and yet which may be easily and quickly released from the shaft for the rapid interchange of implements without the use of special tools.

Prior to the present invention, there were no known retaining devices which could provide the positive locking contact required between the device and the shaft at high rotary speed without compromising on the size, complexity or the ability of the device to be easily and quickly released from the shaft when desired. Several retainer nuts of the prior art provided sufficient clamping force betwen the nut and the shaft to safely retain the implement on the shaft, but usually special tools and the application of considerable force were required to release the nut from the shaft. Several prior art retainer nuts offered the advantage of quick releasability but were often times dangerous at high rotary speeds due to the inability of the retainer nut to maintain sufficient clamping force between the nut and the shaft in order to retain the implement on the shaft.

The retainer nut of the present invention provides the advantages of positive locking engagement between the nut and the shaft at high rotary speeds and the quick releasability of the nut from the shaft for the rapid interchanging of rotary implements, in a safe, compact, easy to use and extremely versatile mechanism.

Accordingly, an object of the present invention is to provide a quick release retainer fastener suitable for use on shafts which rotate at high speeds.

Another object of the invention is to provide a quick release split type retainer nut in which separation of the nut halves by centrifugal force on a rotating shaft is prevented and in which the clamping force of the nut halves on the shaft increases with increasing rotary speeds.

A further object of the invention is to provide a compact spring loaded split type retainer fastener having additional structure adapted to hold each half of the fastener onto a rotating shaft by centrifugal force.

Another object of the present invention is to provide a retainer nut having a pair of cooperating slide members which are normally resiliently urged in a radially outwardly direction for engaging the shaft and are adapted to provide an increasing clamping force on the shaft responsive to increased rotary speed thereof, the slide members being further adapted to be manually biased in a radially inwardly direction for release of the nut from the shaft.

Another object of the invention is to provide a compact, spring loaded, split-type retainer nut having slidable guide members integral with each nut half with an elongated centrally apertured housing in which a portion of the guide member extends from the nut half beyond a rotating shaft onto which the nut, mounted through the aperture, is acted upon by centrifugal force to hold the nut onto the shaft.

Another object of the invention is to provide a quick

2 release retainer nut for rotary shafts in which the assembly housing is adaptable to connection with rotary implements, or alternatively, in which the assembly housing comprises a simplified all-purpose structure.

The retainer nut of the present invention is essentially comprised of a housing having a centrally located aperture therein for insertion of a shaft therethrough, and a pair of cooperating slide members mounted within the housing for diametrically opposed movement relative to each other in a plane normal to the axis of the housing aperture. Each slide member has a substantially semicircular inwardly facing jaw portion similar to a half nut integrally connected at one end thereof adapted for clamping engagement with the threaded end of the shaft. The jaw portions are normally spring biased into engagement with the shaft. In order to position the retaining nut on the shaft and likewise to release it therefrom, the slide members are manually urged radially inwardly against the spring pressure to thereby break the clamping engagement of the jaw portions with the shaft and allow the shaft to slip freely through the housing aperture.

A portion of each slide member distally located from the jaw portion is of sufficient mass to effect a substantial centrifugal force which provides a positive locking engagement between the jaw portion and the shaft while the shaft is rotating at high speeds. In this manner, the retainer nut of the present invention provides increasingly greater clamping forces between the nut and the shaft as the rotary speed of the shaft increases, thereby affording a much greater degree of safety in the operation of the rotary implement than was possible with similar retaining devices of the prior art.

Further objects are to provide a construction of maximum simplicity, economy, and ease of manufacture, also such further objects, advantages and capabilities as will fully appear and as are inherently possessed by the device and the invention described herein.

Invention further resides in the combination, construction and arrangement of parts illustrated in the accompany drawings, and while there is shown therein a preferred embodiment thereof, and two variations, it is to be understood that the same is merely illustrative of the invention and that the invention is capable of modification and change, and comprehends other details of construction without departing from the spirit thereof or the scope of the appended claims.

In the drawings:

FIGURE 1 is a perspective view of the quick release retainer nut of the present invention;

FIGURE 2 is an exploded perspective view showing the details and arrangement of the parts of the retainer nut;

FIGURE 3 is a top plan view showing the jaws of the retainer nut in shaft-engaging position;

FIGURE 4 is similar to FIGURE 3 showing the jaws in the release position;

FIGURE 5 is a perspective view of a modification of the retainer nut;

FIGURE 6 is an exploded perspective view of the modification shown in FIGURE 5;

FIGURE 7 is a top plan view of the modification of FIGURE 5 showing the jaws in shaft-engaging position;

FIGURE 8 is similar to FIGURE 7 showing the jaws in the release position;

FIGURE 9 is a sectional view taken along the line IX—IX of FIGURE 7;

FIGURE 10 is a perspective view of a modification of the present invention embodying a pair of release levers;

FIGURE 11 is a side elevational view partly in section of the modification of FIGURE 10, showing the release levers in the neutral position;

FIGURE 12 is similar to FIGURE 11, showing the levers in the release position.

Referring now to the drawings, and more specifically to FIGURE 1, there is shown in the retainer nut of the present invention, indicated generally at 10. As can best be seen in FIGURE 2, nut 10 is comprised of a base member 11, a saddle-shaped housing 14, and slide members 26 and 27, respectively. Base member 11 may be circular, as shown, or alternatively, may be of any desired geometric shape or may even be an integral part of a rotary implement, such as a grinding wheel or the like. Base 11 has a centrally located bore 12 through which the driving shaft (not shown) is inserted, and a smooth upper face 13 upon which slide members 26 and 27 move, as will be hereinafter described. A pair of openings 17 are provided for attaching housing 14 to base 11 by means of screws 16 or any other suitable means.

Housing 14 is generally saddle-shaped and acts as both a housing and a guideway for slide members 26 and 27. A bore 19 is positioned in housing 14 so as to be axially aligned with bore 12 of base 11 when housing 14 is secured to base 11, thereby permitting the shaft (not shown) to pass through the entire retainer nut assembly. The end portions 38 along the elongated axis of housing 14 are curved, as are the end portions 40 and 41 of slide members 27 and 26, respectively, to coincide with the shape of base 11 and thereby provide a smooth, geometric appearance for the entire assembly.

Slide members 26 and 27 are identical in size and are adapted to fit together in generally mating relation for limited opposed movement relative to each other as well as to base 11 and housing 14. Slide member 26 has a pair of longitudinally extending members 35 which slide on guide surfaces 36 extending longitudinally on both sides of slide member 27. An abutment 34 integrally connected to the inner wall at the rear of each runner 35 of slide member 26 cooperates with a similar abutment 35 positioned in each guide surface 36 of slide member 27 to thereby form a pair of enclosed spring guides 43 into which are inserted springs 31 and 32. Therefore, slide members 26 and 27 will be resiliently urged away from each other by the action of springs 31 and 32 against abutments 33 and 34. Further guide means are provided for controlling the movement of slide members 26 and 27 by means of walls 37 of housing 14. Slide members 26 and 27 are precisely the same width and therefore present a flush side wall on each side when the slide members are assembled. The distance between walls 37 is such as to cause the assembled slide members 26 and 27 to be guided by walls 37 yet permit sliding movement therealong.

Slide member 26 has in the center portion thereof an opening of sufficient size through which the shaft (not shown) may freely pass. Slide member 27 also has an opening in the center portion thereof, the size of the opening being determined by the width of wall portion 44 of slide member 26 so as to permit wall portion 44 to be inserted therein upon assembly.

The inner periphery of the opening in slide member 26 adjacent wall portion 44 is adapted to define a substantially semi-circular jaw portion 28. A similar jaw portion 29 is provided in slide member 27. The jaw portions 28 and 29 will be urged into peripheral engagement with the shaft due to the action of springs 31 and 32 upon slides 26 and 27, as hereinbefore described. The periphery of each jaw portion is adapted to conform to the periphery of the shaft to insure locking engagement between jaw portion and shaft. For example, if the portion of the shaft which the retainer nut will contact is threaded, then jaw portions 28 and 29 will also be threaded for meshing engagement with the threads of the shaft. It will be obvious that any interlocking arrangement or combination of arrangements may be employed without departing from the spirit of the present invention. For example, interlocking rings alternately positioned on the shaft and on the jaw portions, or a combination of rings and cooperating grooves may be employed.

Each of slide members 26 and 27 has a relatively massive end portion 39 and 40, respectively, positioned radially remotely relative to the shaft for the purpose of providing substantial weight and mass upon which the centrifugal force created by high rotary speed may act in order to provide increased clamping force between the jaw portions 28 and 29 and the shaft. End portions 39 and 40 may be provided with additional weighting means, if desired, by the insertion of heavy metallic screws, or the like, to thereby provide increased centrifugal force and hence more clamping force between the jaw portions and the shaft. End portions 39 and 40 have upstanding flange portions 41 and 45, respectively, which fit into the flanged portions formed by the extension of walls 37 beyond top portion 21 of housing 14 to thereby afford better control of the movement of slide members 26 and 27.

In operation, the retainer nut is clipped on the shaft (not shown) without engaging the threads thereof by manually pressing slide members 26 and 27 radially inwardly, as shown in FIGURE 4. In this manner, jaw portions 28 and 29 are retracted to allow the shaft to pass freely through the entire nut. When the nut is firmly in place against the rotary implement, the slide members are released and are urged radially outwardly by springs 31 and 32 to thereby engage jaw portions 28 and 29 with the shaft, as shown in FIGURE 3. As the shaft begins to rotate with increasingly higher speeds until the proper rate is reached, centrifugal force will act upon the end portions 39 and 40 to pull slide members 26 and 27 outwardly and thereby increase the clamping force between the jaw portions and the shaft. The cooperating threaded peripheries of the jaw portions and the shaft plus the centrifugal force created by the high rotary speed of the shaft combine to make it virtually impossible for the retainer nut of the present invention to become separated from the shaft during rotation thereof or permit the tool which is thereby secured to the shaft, to shift or loosen. When the shaft has stopped rotating, the resistance of the work as well as results of inertia and centrifugal force cause it to retain the maximum tightness allowed by the tolerances of its parts. A squeeze force is applied to release the engagement and slip the nut off the end of the shaft.

In some instances it takes a strong squeeze to remove the retainer nut merely by pressing inwardly on end portions 39 and 40 for releasing the jaw portions from the shaft. FIGURES 10 through 12 illustrate a modification of the present invention embodying a lever release means which provides a mechanical advantage for facilitating release of the nut from the shaft. Referring specifically to FIGURE 11, there is shown the tab lever 80 consisting of a force applying portion 83 and an integrally connected, downwardly tapered portion 87 extending into a correspondingly tapered slot 82 positioned in slide members 39 and 40. The front portion of tapered position 87 abuts against the front of slot 82 and 88 and is in angular relation with force applying portion 83, such that a space is created between force applying portion 83 and the front of slot 82 into which force applying portion 83 will move when pressure is exerted inwardly on portion 83, as will be later described.

A boot-like flanged portion 84 is securely attached, as by screws or the like, to the lower end of tapered portion 87 and is positioned in a similarly shaped groove 86 in the upper face of plate 11. In order to prevent lever 80 from becoming detached from the assembled retainer nut, flanged portion 84 is sufficiently larger in size than the lower end of slot 82 so that portion 84 cannot pass through slot 82. It will therefore be obvious that in assembling the retainer nut, lever 80 will be placed in slot 82 and flanged portion 84 will be attached to the lower end of tapered portion 87 through the bottom of slot 82.

The bottom of flanged portion 84 is curved to allow portion 84 to pivot freely within groove 86 when lever 80 is rotated.

When it is desired to release the retainer nut from a shaft, finger pressure is applied in a radially inwardly direction to the force applying portion 83 of lever 80. Since the lower end 84 of lever 80 cannot move relative to the nut, but merely pivots in groove 86, lever 80 will pivot about pin 88 and thereby cause slide members 39 and 40, respectively, to be urged in a radially inwardly direction, as shown in FIGURE 12. As previously described, this movement releases the jaw portions 28 and 29 from the shaft and the retainer nut may then be removed from the shaft.

In the manner above described, it is possible to obtain a mechanical advantage of three or four in applying a releasing force to release the jam portions from the shaft. For example, if a force of sixty pounds is required to disengage the jaw portions from the shaft, a force of only one-third that amount, or twenty pounds, need be applied to the force applying portion 83 of each lever 80.

Another modification of the present invention employing an alternate spring means is shown in FIGURES 5–9. Disc 51 has a smooth upper surface 52 to which is attached housing 56, as in the previously described embodiment. Slide members 57 and 58 having split nuts 61 and 62, respectively, integrally mounted thereon are adapted for relative sliding movement in surface 52 of disc 51 within housing 56. End portions 63 and 64 of slide members 57 and 58, respectively, are spaced from split nuts 61 and 62 to allow the insertion of a resilient ring 67 between end portions 63 and 64 in abutting relation with faces 66 thereof. Ring 67 is secured in this position by means of pins or screws 68 extending through suitable holes in end portions 63 and 64 and ring 67.

In this manner, ring 67 will normally maintain slide members 57 and 58 in generally extended relation, as may be seen in FIGURE 7. When it is desired to place the retainer nut on the shaft or remove it therefrom, the slide members are urged inwardly against the pressure or ring 67 by applying pressure to end portions 63 and 64, thereby causing split nuts 61 and 62 to disengage from the shaft, as shown in FIGURE 8.

Thus there is provided by the present invention a retainer nut for use on high speed rotary shafts, which combines the advantage of safe, positive, locking engagement with the shaft at high speeds with that of being quickly and easily disengaged from the shaft when desired. In addition, the retainer nut of the present invention is comprised of relatively few parts compared to prior art devices, and is therefore very easy to assemble and disassemble.

I claim:
1. A retainer nut assembly for securing a working implement onto a threaded rotating shaft for rotation therewith, in combination, a base having a flat outer surface at right angles to the axis for frictional abutment with the rotating tool, a housing mounted on said base and having parallel guideways therein, a pair of substantially similar interlocking slide members positioned in said housing between said guideways for limited sliding movement relative thereto, said slide members having cooperating guide members and guideways for limited opposed movement relative to each other in a plane transverse to the axis of said shaft with restricted radial movement, said base, said housing and each of said slide members each having a centrally located and axially aligned opening therein for insertion of said shaft therethrough when said slide members are moved radially inward, each of said slide members having a portion of the inner periphery of said opening therein defining a threaded arcuate jaw portion for interlocking engagement with the threads of said shaft, spring means cooperating between said slide members for urging said slide members apart so as to cause said threaded jaw portions to converge upon and generally encircle said shaft in threaded engagement, each of said slide portions having a relatively massive portion integrally connected therewith and diametrically opposed from its corresponding jaw portions, said massive portion being acted upon by centrifugal force by high rotary speeds of the shaft to pull its corresponding jaw portions into tighter threaded engagement, with the maximum outward movement equal to or less than the diameter of said base, and release means operably associated with said slide members and pivotally mounted in said base and within the dimensions thereof for releasing said jaw portions from threaded engagement with said shaft when said shaft is at rest, said release means comprising a pair of tab levers, engaging means providing pivotal movement between said base and one end of each of said levers, each of said levers having a cam portion intermediate their ends to engage said slide members for urging said slide members radially inward against said spring means as the levers are pivotally moved thereby releasing the threaded engagement of said jaw portions.

2. A retainer nut assembly for securing a working implement onto a threaded rotatable shaft for rotation therewith, comprising a base having a flat outer surface for full frictional bearing against a tool, a housing mounted on said base, a pair of cooperating interlocking elongated slide members slidably positioned on said base within said housing and adapted for limited opposed movement relative to each other and restricted radial movement, said base, said housing and said slide members each having a centrally located, axially aligned opening therein for insertion of said shaft therethrough without use of the threads when said slide members are moved radially inward, a portion of the inner periphery of each of said slide members defining a substantially semi-circular threaded jaw portion, each jaw portion being adapted to lockingly engage the threads of said shaft, and spring means cooperating between said slide members for normally biasing said jaw portions into locking engagement with said shaft, each of said slide members having an integral weighted portion along the elongated axis thereof distally removed from said jaw portion for securely locking both said jaw portions on said shaft by means of centrifugal force acting on said weighted portions due to high rotary speeds of said shaft, tab lever members coextensive with the base perimeter pivotally mounted in said base and bearing against said weighted end portions, said levers lying entirely within the periphery of said base when in their outermost position, said slide members being adapted to be manually biased against said spring means by inward pressure against the weighted portions exerted by pivoting said tab lever members for disengaging the locking engagement of said threaded jaw portions with said threaded shaft thereby permitting removal of said retainer nut assembly from said shaft.

3. A retainer nut assembly for securing a working implement onto a threaded rotating shaft for rotation therewith comprising a base having a flat outer surface at right angles to the axis for frictional abutment with the rotating tool, a housing mounted on said base and having parallel guide ways therein, a pair of substantially similar interlocking slide members positioned in said housing between said guide ways for limited sliding movement relative thereto, said slide members having cooperating guide members and guide ways for limited opposed movement relative to each other in a plane transverse to the axis of said shaft with restricted radial movement, said base, said housing and each of said slide members each having a centrally located axially aligned opening therein for insertion of said shaft therethrough when said slide members are moved radially inward, each of said slide members having a portion of the inner periphery of said opening therein defining a threaded arcuate jaw portion for interlocking engagement with the threads of said shaft, spring means cooperating between said slide members for urging said slide apart so as to cause said threaded jaw portions to converge upon and generally encircle said shaft in threaded engagement, each of said slide members having a relatively massive portion integrally connected therewith and diametrically opposed from its corresponding jaw portion, said massive portion being acted upon by centrifugal force created by high rotary speeds of the shaft to pull its corresponding jaw portions into tighter threaded engagement with said shaft during rotation thereof with maximum outward movement equal to or less than the diameter of said base, and tab lever release means having levers lying entirely within the periphery of said base when in their outermost position operably engaging the outer ends of said slide members and pivotally mounted in said base for disengaging said jaw portions from threaded engagement with said shaft when the shaft is at rest.

References Cited in the file of this patent

UNITED STATES PATENTS

| | | |
|---|---|---|
| 221,495 | Barnes | Nov. 11, 1879 |
| 966,672 | Ellison | Aug. 9, 1910 |
| 1,150,895 | Sloan | Aug. 24, 1915 |
| 2,209,495 | Scholfield | July 30, 1940 |
| 2,443,614 | Gray | June 22, 1948 |
| 2,489,895 | Kash | Nov. 29, 1949 |

FOREIGN PATENTS

| | | |
|---|---|---|
| 305,478 | Great Britain | Dec. 12, 1929 |